United States Patent [19]

Sato et al.

[11] 4,072,988
[45] Feb. 7, 1978

[54] CASSETTE LOADING DEVICE IN A CASSETTE TAPE RECORDER

[75] Inventors: Manabu Sato, Yokohama; Shigeru Matumoto, Hiratsuka, both of Japan

[73] Assignee: Victor Company of Japan, Ltd., Japan

[21] Appl. No.: 669,630

[22] Filed: Mar. 23, 1976

[30] Foreign Application Priority Data

Apr. 22, 1975 Japan .............................. 50-54088[U]

[51] Int. Cl.² ........................ G11B 23/08; G11B 15/00
[52] U.S. Cl. ....................................... 360/96; 360/137
[58] Field of Search ...................... 360/137, 96, 95, 94; 242/55, 19 R

[56] References Cited

U.S. PATENT DOCUMENTS

| 3,729,202 | 4/1973 | Wakabayashi | 360/96 |
| 3,870,247 | 3/1975 | Carisey | 360/96 |
| 3,950,787 | 4/1976 | Hosaka | 360/96 |

FOREIGN PATENT DOCUMENTS

| 2,100,092 | 7/1972 | Germany | 360/96 |

*Primary Examiner*—Jay P. Lucas
*Attorney, Agent, or Firm*—Holman & Stern

[57] ABSTRACT

In a cassette tape recorder having a loading space for accommodating a cassette loaded thereinto and having a capstan adapted to enter relatively into a capstan receiving opening in the cassette and to drive a tape within the cassette, a cassette loading device comprises a cassette holder for receiving and holding the cassette inserted thereinto, and a cassette holder supporting member rotatably supporting said cassette holder by means of a first pivot shaft. The cassette holder supporting member is rotatably supported by a second pivot shaft. The second pivot shaft is disposed in a fixed position such that the distance between the second pivot shaft and said capstan is relatively small. The capstan receiving opening undergoes a displacing movement resulting from a combination of a rotational displacing movement thereof about the second pivot shaft and a rotational displacing movement thereof about the first pivot shaft, whereby the capstan is inserted relatively into said opening, and the cassette is loaded into said loading space.

5 Claims, 4 Drawing Figures

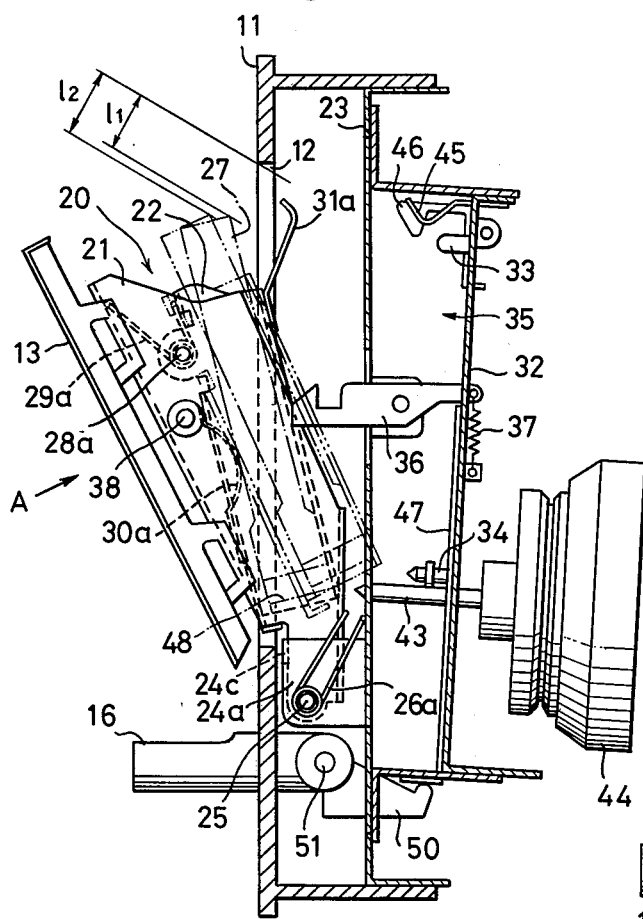
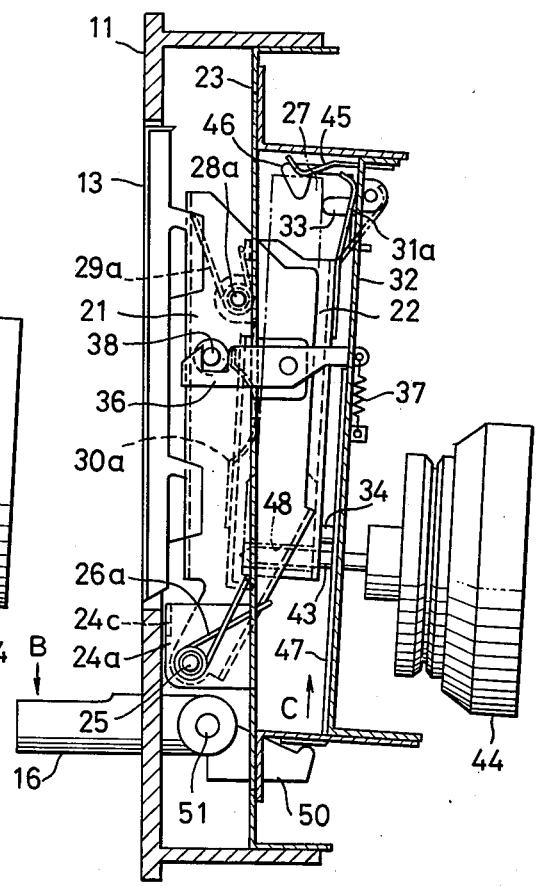

CASSETTE LOADING DEVICE IN A CASSETTE TAPE RECORDER

BACKGROUND OF THE INVENTION

The present invention relates to cassette loading device in cassette tape recorders, and more particularly to a cassette loading device which, in a cassette tape recorder of the type wherein a cassette is loaded in a vertical state, affords ease in the operation of loading and unloading a cassette and has a structure of small size.

In general, the cassette tape recorder is classified into two types, namely, a horizontal type wherein a cassette is loaded in a horizontal state into the tape recorder, and a vertical type wherein a cassette is loaded in a vertical state. In either of the above described types, it is preferable for users that the tape within the cassette travels in the same direction (i.e., a direction from left to right) as in the conventional open-reel type tape recorders.

In the above described vertical type cassette tape recorder, the cassette is loaded with the forward end having openings thereof facing downward, and accordingly, the capstan is disposed at a lower part of the cassette loading space. For this purpose, the cassette loading device in the vertical type cassette tape recorder is provided with a cassette holder having a pivotal hinge at the lower side of the cassette loading space. When the cassette is to be loaded, the cassette holder is tilted and opened toward front side, and then the cassette is inserted into the holder from above with the forward end thereof facing downward. Thereafter, the cassette holder is rotated back to its original vertical position together with the cassette inserted therein.

Here, since the capstan receiving opening of the cassette accommodated within the cassette holder is positioned at a lower side, the capstan receiving opening rotates with a relatively large curvature (small radius of curvature) about the pivotal hinge of the cassette holder. Therefore, in the prior art cassette loading device, in order to carry out smoothly the operation of engaging the capstan relatively into the capstan receiving opening when the cassette is rotated with the cassette holder, the distance between the capstan receiving opening of the cassette within the cassette holder and the pivotal fulcrum of the cassette holder has heretofore been made large so that the curvature of the rotating locus of the capstan receiving opening will be rendered small as much as possible.

Accordingly, the above described conventional cassette loading device in the vertical type cassette tape recorder is accompanied by difficulties arising from the fact that the height dimension of the cassette holder becomes large, whereby the cassette tape recorder becomes bulky. Particularly, in the instance where this cassette tape recorder is used as a cassette tape recorder deck in combination with the other apparatuses such as a tuner and an amplifier, that is, in the case of a so-called component type set, there arises the difficulty of attaining a balance between the size of this cassette tape recorder and those of the above mentioned other apparatuses.

SUMMARY OF THE INVENTION

Accordingly, it is a general object of the present invention to provide a novel and useful cassette loading device in a cassette tape recorder which overcomes the above mentioned difficulties.

Another and more specific object of the present invention is to provide a cassette loading device in which the structure thereof is of small size, and the operation of engagement with the capstan and reel shafts can be accomplished smoothly on loading the cassette. The device of the present invention is particularly effective when it is applied to a vertical type cassette tape recorder.

Still another object of the present invention is to provide a cassette loading device in a cassette tape recorder in which a cassette holder is adapted to rotate about substantially two shafts as pivotal fulcrums. According to the device of the present invention, a capstan receiving opening of a cassette moves with less displacement in the direction at right angles to a capstan shaft, thereby to effect a smooth relative insertion of the capstan shaft into the capstan receiving opening of the cassette. Further, in accordance with the present invention, the opening angle of a cover supporting the cassette holder can be made small, and the insertion and removal of the cassette into and from the cassette holder can be achieved easily.

Additional objects and features of the present invention will become apparent from the following detailed description when read in conjunction with the accompanying drawings.

BRIEF DESCRIPTION OF THE DRAWINGS

In the drawings:

FIG. 2 is a side elevation, with some parts in vertical section, of one embodiment of the cassette loading device according to the present invention in a state wherein a cover is opened;

FIG. 3 is a similar side elevation of the device in a state wherein the cover is closed and the cassette is loaded.

DETAILED DESCRIPTION

Figure 1:
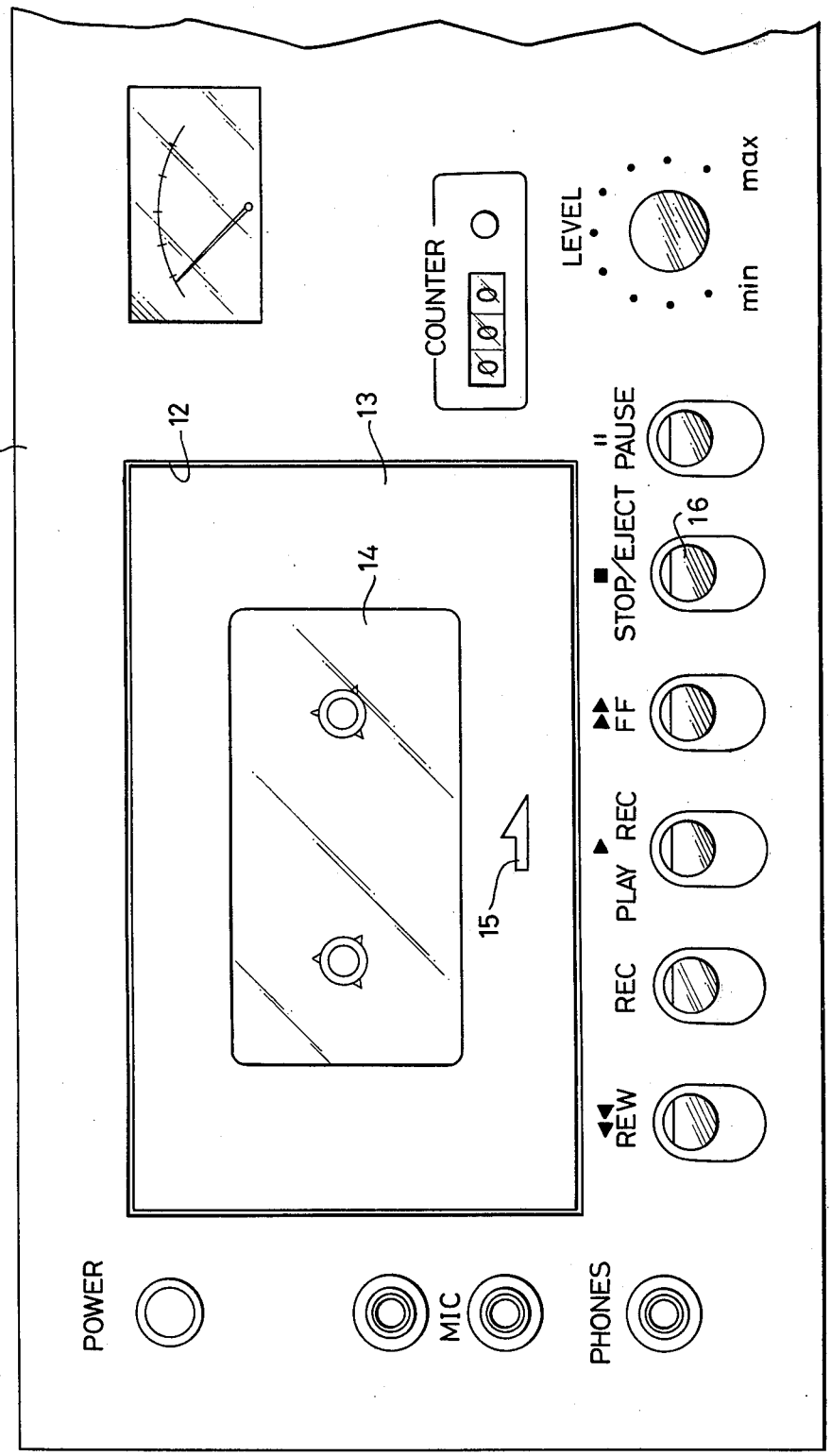
FIG. 1 is a front elevation, with a part cut away, of a front panel part of one example of a cassette tape recorder in which a cassette loading device of the present invention can be applied.

FIG. 1 is a front view of a vertical type cassette tape recorder 10, which is normally used with its front panel 11 positioned vertically. In an opening 12 of the front panel 11 is fitted a cover 13 of single-side opening construction, which is provided with a transparent part 14 through which tape rolls of a cassette loaded in the interior can be observed. On the front surface of the cover 13 is formed an arrow mark 15 pointing toward the right for indicating the running direction of the tape accommodated within the cassette thus loaded. A plural number of manipulation buttons including an eject button 16 are provided on the front panel 11 along its lower side.

Figure 4:
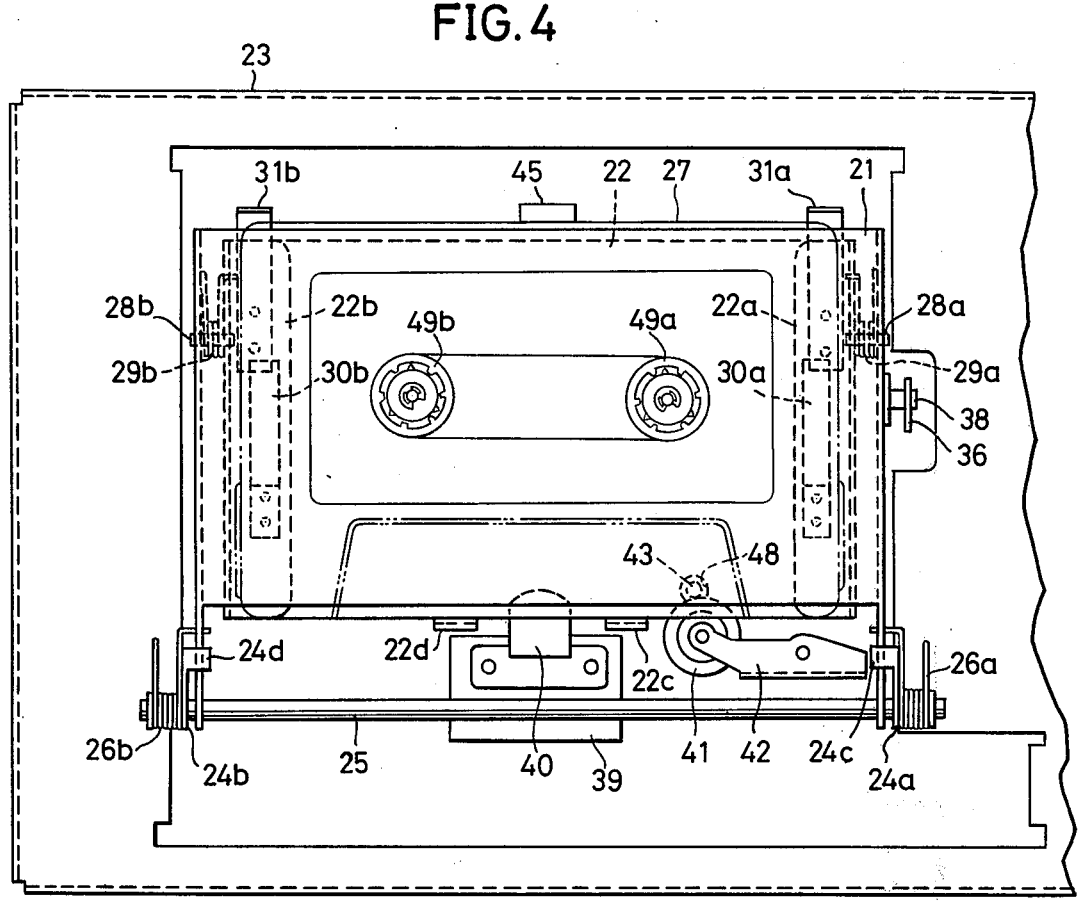
FIG. 4 is a front elevation of the same device in the state illustrated in FIG. 3 with the front panel and the cover of the tape recorder removed.

A cassette loading device 20 according to the present invention comprises, essentially, the cover 13, a cassette holder supporting member 21, and a cassette holder 22, as illustrated in FIGS. 2 through 4. The cassette holder supporting member 21 is rotatably supported at its lower end part by a horizontal shaft 25 which extends transversely between projections 24a and 24b provided on a chassis 23. This shaft 25 is disposed at a position in the vicinity of the lower end of the cassette holder 22. Accordingly, the cassette holder supporting member 21 has a relatively small height or small dimension between the upper and lower ends and is of small size.

The cassette holder supporting member 21 is continually urged to rotate in the counterclockwise direction as viewed in FIG. 2, that is, in the direction of opening, by torsion springs 26a and 26b each of which is provided around the shaft 25 and is anchored at its one end to the chassis 23 and connected at its other end to the cassette holder supporting member 21. The cassette holder supporting member 21, in the state illustrated in FIG. 2, is engaged at parts thereof with bent parts 24c and 24d (FIG. 4) of the projections 24a and 24b and is restricted in its rotational position.

The cover 13 is removably attached to the cassette holder supporting member 21. Otherwise, the cover 13 may be fixedly attached to the cassette holder supporting member 21. However, the removable structure as described in the present embodiment is preferable since it is convenient when cleaning and adjusting operations for a magnetic head are to be carried out.

The cassette holder 22 includes bent parts 22a through 22d and holds a cassette 27 which is inserted downwardly within a space enclosed by these bent parts 22a through 22d. The cassette holder 22 is pivotally mounted at its part in the vicinity of the upper side thereof on the cassette holder supporting member 21 by means of shafts 28a and 28b. The cassette holder 22 is urged to rotate in the clockwise direction with respect to the cassette holder supporting member 21 as viewed in FIG. 2 by torsion springs 29a and 29b. The torsion springs 29a and 29b are respectively wound around shafts 28a and 28b, and are anchored at their ends on one side to the cassette holder supporting member 21 and at their ends on the other side to the cassette holder 22.

Under the bent parts 22a and 22b of the cassette holder 22 are secured leaf springs 30a and 30b of arcuate form. Further, at the upper end of the rear side of the cassette holder 22 are secured leaf springs 31a and 31b.

To the chassis 23 is fixed a bracket 32 for forming a space 35 for cassette loading. The bracket 32 is inclined somewhat rearwardly from the vertical position for preventing the occurence of disorderly or disheveled winding of the tape within the loaded cassette 27 and has studs 33 and 34 which are embeddedly fixed thereto. Moreover, a lock lever 36 is pivotally mounted on the chassis 23, and is being urged by a spring 37 in the direction for engaging with a pin 38 fixed to the side surface of cassette holder supporting member 21. The lock lever 36 is forced to turn by a lever 47 which is caused to slide in accordance with the manipulation of the eject button 16.

At the lower side of the cassette loading space 35, there are provided a magnetic head 40 fixed to a head base 39 so as to be vertically slidable together with the head base 39 and a pinch roller 41 rotatably supported on a rotatable arm 42. A capstan 43, which has a flywheel 44 formed unitarily therewith and is rotated by the rotation of the motor transmitted thereto, is passed through the bracket 32 and projects into the cassette loading space 35.

Furthermore, at the upper side of the cassette loading space 35, there are provided a leaf spring 45 which pushes against the rear end (the upper end in FIG. 3) of the cassette 27 and a lever 46 for detecting a lug for preventing erroneous erasing of the cassette.

The manipulative control and operation of the apparatus of the above described construction will now be described.

When the pin 38 is in a state wherein it is not engaged by the lock lever 36, the cassette holder supporting member 21 is in an open state wherein it has been rotated in the counterclockwise direction by the force of the springs 26a and 26b as shown in FIG. 2. The cassette holder 22 is also in a state wherein it has rotated in the counterclockwise direction together with the cassette holder supporting member 21 with respect to the shaft 25. Moreover, the cassette holder 22 is in a state of having been rotated in the clockwise direction about the shafts 28a and 28b by the force of the springs 29a and 29b relative to the cassette holder supporting member 21.

Into the cassette holder 22 in the above described state, a cassette 27 is inserted from above with its forward end facing downward and is caused to be held therein. Next, the cover 13 is pushed in the direction of the arrow A to cause the cassette holder supporting member 21 to rotate in the clockwise direction as viewed in FIG. 2 about the shaft 25, counter to the force of the springs 26a and 26b.

With the rotation of the cassette holder supporting member 21 and the cover 13 in the clockwise direction, the cassette holder 22 is also rotated unitarily, whereby a capstan receiving opening 48 of the cassette 27 is engaged relatively with the distal end of the capstan 43. Here, since a radius R2 of rotation of the capstan receiving opening 48 about the shaft 25 is small, the displacement of the capstan receiving opening 48 in the direction perpendicular to the axial direction of the capstan 43 is relatively large. Therefore, when the cassette holder 22 is rotated unitarily with the cassette holder supporting member 21 as it is up to a position where the rotation of the cassette holder supporting member 21 terminates, the capstan 43 cannot enter relatively into the capstan receiving opening 48 in a smooth manner. Therefore, according to the present invention, this problem is solved by the structure and operation described hereinafter.

When the cassette holder 22 is further rotated together with the cassette holder supporting member 21, the leaf springs 31a and 31b abut against the bracket 32. Here, the leaf springs 31a, 31b and the torsion springs 29a, 29b are so adapted that the resilient force of the springs 31a and 31b is greater than that of the springs 29a and 29b. Accordingly, when the cassette holder supporting member 21 is forced to be rotated further from the above mentioned state, the cassette holder 22 is pushed relatively by the leaf springs 31a and 31b and is thereby subjected to a moment causing it to rotate in the counterclockwise direction about the shafts 28a and 28b. Accordingly, as the cassette holder supporting member 21 rotates, the cassette holder 22 is rotated in the clockwise direction together with the cassette holder supporting member 21 about the shaft 25 and, at the same time, is pushed by the leaf springs 31a and 31b and rotated in the counterclockwise direction relative to the cassette holder supporting member 21 about the shafts 28a and 28b.

The capstan receiving opening 48 of the cassette 27 held within the cassette holder 22 rotates with a radius R1 with respect to the shafts 28a and 28b which undergo rotational displacement with a radius R about the shaft 25. The radii R, R1, and R2 have a relationship of $R2 < R1 < R$. Accordingly, the capstan receiving opening 48 of the cassette 27 passes along the combined locus of the rotational locus with the radius R2 in the clockwise direction about the shaft 25 and the rotational locus with the radius R1 in the counterclockwise direction about the shafts 28a and 28b. Therefore, the capstan receiving opening 48 moves in the axial direction of the capstan 43 with a small displacement in the direction perpendicular to the axial direction, whereby the capstan 43 is caused to enter relatively into the opening 48. As a result, even in the case where the distancd between the capstan receiving opening 48 of the cassette 27 and the shaft 25 is rather small, the capstan receiving opening 48 can be entered relatively by the capstan 43 in a smooth manner without the capstan 43 sticking against the cassette 27 at a portion thereof or against the tape within the cassette.

In the state where the cassette holder supporting member 21 and the cassette holder 22 have rotated to the predetermined cassette loading position as illustrated in FIG. 3, the capstan 43 has entered into the capstan receiving opening 48 of the cassette 27 in normal state. Further, reel spindles or shafts (now shown) have been inserted into and engaged with spools 49a and 49b of the cassette 27. Furthermore, the pin 38 of the cassette holder supporting member 21 is engaged with the lock lever 36, and, as a result, the cover 13, the cassette holder supporting member 21, and the cassette holder 22 are locked or held in the state shown in FIG. 3 even when the operator removes his hand from the cover 13.

Furthermore, the leaf springs 31a and 31b press against the bracket 32 and thereby deform elastically so as to impart rotational force to the cassette holder 22 in the counterclockwise direction. The leaf springs 30a and 30b are pushed by the cassette 27 relatively and deform elastically so as to impart a pushing force against the cassette 27. The cassette 27, however, is engaged with the studs 33 and 34, and is therefore positioned.

Further, in the above mentioned state where the cassette 27 is loaded, the cassette 27 is pushed downwards at its rear end (the upper end in FIG. 3) by the leaf spring 45, and, accordingly, the spools 49a and 49b engage positively with the above mentioned reel shafts. The detection lever 46 operates to detect the existence and non-existence of the well-known lug formed on the rear end of the cassette 27. If the cassette 27 is loaded with the lug removed, the detection lever 46 enters into a recess in the cassette 27 and prevents the tape recorder from assuming the recording mode by means of well-known mechanisms, so that erroneous erasing is prevented.

Next, when the cassette 27 is to be removed, the eject button 16 is pushed and rotated in the direction of the arrow B. As a result of this rotation of the eject button 16, a rotational lever part 50 which is formed unitarily with the eject button 16 is rotated in the counterclockwise direction about a shaft 51 thereby to move a sliding lever 47 in a sliding motion in the direction of the arrow C. Consequently, the lock lever 36 is pushed by the upper end of the sliding lever 47 and rotates in the counterclockwise direction, whereby the pin 38 is released from its locked state due to the lock lever 36.

When the pin 38 is thus unlocked, the cassette holder supporting member 21 is rotated about the shaft 25 in the counterclockwise direction by the resilient force of the springs 26a and 26b unitarily with the cassette holder 22 and the cover 13. Simultaneously, the cassette holder 22 is rotated, with respect to the cassette holder supporting member 21 about the shafts 28a and 28b in the clockwise direction by the resilient force of the springs 29a and 29b. Accordingly, as in the case of the above described cassette loading mode, the cassette 27 moves so that the capstan receiving opening 48 moves through a small displacement in the direction perpendicular to the axial direction of the capstan 43, whereby the capstan 43 is extracted relatively from the capstan receiving opening 48 in a smooth manner.

As a result of the above rotation of the cassette holder supporting member 21, the cassette holder 22, and the cover 13, these components resume a state as indicated in FIG. 2. Accordingly, the cassette 27 can be held manually and extracted from the cassette holder 22. Further, the cassette 27 can be extracted while the cassette 27 is caused to rotate about the shafts 28a and 28b in the counterclockwise direction together with the cassette holder 22 as indicated by a two-dot chain line by inserting the tips of fingers into the opening 12 of the front panel 11. In this case, the space between the upper end of the cassette 27 and the opening 12 of the fron panel 11 is enlarged from l1 to l2, and, as a result, the cassette extracting operation will be further facilitated.

Further, in the foregoing embodiment, there are provided respectively pairs of springs 26a and 26b, 29a and 29b, 30a and 30b, and 31a and 31b, but either one of each pair of the aforementioned springs may be omitted. Moreover, the leaf springs 31a and 31b may be provided on the bracket 32 or the chassis 23 instead of on the cassette holder 22 so that they engage elastically with the upper part of the cassette holder 22 which has rotated to the loading position. In this mechanism, instead of using the leaf spring, a rigid lever and a coil spring engaged with the lever may be used and so adapted that the coil spring imparts resilient force to the lever.

Further, this invention is not limited to these embodiments but various variations and modifications may be made without departing from the scope and spirit of the invention.

What is claimed is:

1. In a cassette tape recorder having a loading space for accommodating a cassette loaded thereinto, an opening through which the cassette is inserted and taken out, and a capstan adapted to enter relatively into a capstan receiving opening in the cassette and to drive a tape within the cassette, said cassette loading device comprising:

a cassette holder for receiving and holding the cassette inserted thereinto;

a cassette holder supporting member rotatably supporting said cassette holder by means of a first pivot shaft;

a second pivot shaft for rotatably supporting said cassette holder supporting member between the loading space and an outside of the cassette tape recorder through the opening, said second pivot shaft being disposed at a fixed position in the vicinity of the capstan such that the distance between the second pivot shaft and said capstan is less than the distance between said capstan and the rear end of the cassette inserted into said cassette holder;

first spring means for urging said cassette holder supporting member to rotate about said second pivot shaft toward the outside of the cassette tape recorder;

second spring means for urging said cassette holder to rotate about said first pivot shaft toward a direction which is reverse to the direction of the torque of said first spring means;

pushing means for pushing said cassette holder supporting member so as to rotate about said second pivot shaft toward the loading space against said first spring means;

means, operating in response to the rotation of said cassette holder together with said cassette holder supporting member about said second pivot shaft by said pushing means, for rotating said cassette holder about said first pivot shaft in the direction opposite to the urging direction of said second spring means; and locking means responsive to the accommodation of said cassette holder into the loading space for locking said cassette holder supporting member.

2. A cassette loading device as claimed in claim 1 in which said means for causing said cassette holder to rotate overcoming the torque imparted by said second spring means comprises a leaf spring anchored to said cassette holder and operating when one part thereof contacts a chassis part of the cassette tape recorder upon rotation of said cassette holder to a specific rotational position to impart relatively a torque to the cassette holder as the cassette holder rotates thereafter.

3. A cassette loading device as claimed in claim 1 which further comprises a cover mounted on the cassette holder supporting member in a manner to rotate unitarily therewith, said cassette tape recorder having a front panel provided with the opening permitting rotation of the cassette holder and the cassette holder supporting member, and said cover closing the opening of the front panel when the cassette holder and the cassette holder supporting member have rotated to a loading position in the loading space.

4. A cassette loading device as claimed in claim 1 in which the cassette tape recorder is a vertical-type tape recorder having a vertical front panel on which the opening of the cassette tape recorder is provided and a capstan of an axial direction which is substantially horizontal, and the cassette holder and the cassette holder supporting member are respectively in a substantially vertical state when the cassette is in its loaded state.

5. A cassette loading device as claimed in claim 4 in which the cassette holder holds the cassette with the forward end thereof facing downward and is pivotally supported at a part in the vicinity of the upper end thereof by said first pivot shaft on the cassette holder supporting member, and the cassette holder supporting member is pivotally supported at a lower end thereof by said second pivot shaft.

* * * * *